United States Patent [19]
Woollenweber et al.

[11] Patent Number: 6,085,527
[45] Date of Patent: Jul. 11, 2000

[54] MAGNET ASSEMBLIES FOR MOTOR-ASSISTED TURBOCHARGERS

[75] Inventors: William E. Woollenweber, Carlsbad; Edward M. Halimi, Montecito, both of Calif.

[73] Assignee: Turbodyne Systems, Inc., Carpinteria, Calif.

[21] Appl. No.: 08/857,031

[22] Filed: May 15, 1997

[51] Int. Cl.$^7$ .................................................. F02B 37/14
[52] U.S. Cl. ........................................... 60/607; 310/156
[58] Field of Search ................ 60/607, 608; 310/61, 310/156, 262, 271; 415/115, 177; 416/95, 244 A, 244 R

[56] References Cited

U.S. PATENT DOCUMENTS

| | | | |
|---|---|---|---|
| 2,078,499 | 4/1937 | Ljungstrom | 123/170 |
| 2,173,489 | 9/1939 | Voigt | 308/77 |
| 2,578,785 | 12/1951 | Davis | 230/209 |
| 2,649,048 | 8/1953 | Pezzillo et al. | |
| 2,782,721 | 2/1957 | White | |
| 2,829,286 | 4/1958 | Britz | 310/53 |
| 3,163,790 | 12/1964 | White | 310/54 |
| 3,531,670 | 9/1970 | Loudon | 310/156 |
| 3,557,549 | 1/1971 | Webster | |
| 3,572,982 | 3/1971 | Kozdon | 417/423 |
| 3,961,199 | 6/1976 | Bronicki | |
| 4,445,337 | 5/1984 | McCreary | 60/608 |
| 4,453,381 | 6/1984 | Dinger | 60/612 |
| 4,565,505 | 1/1986 | Woollenweber | 417/407 |
| 4,641,977 | 2/1987 | Woollenweber | 384/99 |
| 4,708,095 | 11/1987 | Luterek | 123/41.42 |
| 4,708,602 | 11/1987 | McEachern, Jr. et al. | 417/407 |
| 4,746,827 | 5/1988 | Ochiai et al. | 310/156 |
| 4,776,168 | 10/1988 | Woollenweber | 60/602 |
| 4,827,170 | 5/1989 | Kawamura et al. | 310/156 |
| 4,850,193 | 7/1989 | Kawamura | 60/608 |
| 4,878,347 | 11/1989 | Kawamura | 60/608 |
| 4,882,905 | 11/1989 | Kawamura | 60/608 |

(List continued on next page.)

FOREIGN PATENT DOCUMENTS

| | | |
|---|---|---|
| 295985 | 12/1988 | European Pat. Off. . |
| 367406 | 9/1990 | European Pat. Off. . |
| 2479899 | 9/1981 | France . |
| 57-212331 | of 0000 | Japan . |
| 58-222919 | 12/1983 | Japan . |
| 59-49323 | 3/1984 | Japan . |
| 3202633 | 4/1991 | Japan . |
| 4-112921 | 4/1992 | Japan . |
| 5-5419 | 1/1993 | Japan . |
| 267149 | 8/1927 | United Kingdom . |
| 308585 | 3/1929 | United Kingdom . |

OTHER PUBLICATIONS

SAE Technical Paper 940842 "Turbo–Compound Cooling Systems for Heavy–Duty Diesel Engines", 1994, W.E. Woollenweber.

Proc. Instn. Mech Engrs. vol. 189, 43/75, "Experimental and Theoretical Performance of a Radial Flow Turbocharger Compresssor with Inlet Prewhirl", 1975, pp. 177–186, F.J. Wallace, et al.

*Primary Examiner*—Michael Koczo
*Attorney, Agent, or Firm*—Brinks Hofer Gilson & Lione

[57] ABSTRACT

An integral turbocharger-electric motor assembly permits the elements of an operating electric motor and turbocharger to be easily assembled into a relatively compact and reliable operating unit. To act as an electric motor rotor, the turbocharger shaft carries a magnet assembly in its central portion between the shaft bearings, in such proximity to the stator windings to provide electromagnetic coupling for the effective conversion of electric energy applied to the stator winding into rotational force applied by the magnet assembly to the turbocharger shaft. The magnet assembly includes a plurality of permanent magnets located around a central core and secured against centrifugal force on a non-magnetic outer sleeve. Such magnet assemblies are preferably formed as a unit that can be assembled onto the turbocharger shaft by retaining an annular arrangement of motor magnets in an assembly between central and outer sleeves.

22 Claims, 4 Drawing Sheets

U.S. PATENT DOCUMENTS

| | | | |
|---|---|---|---|
| 4,885,911 | 12/1989 | Woollenweber et al. | 60/597 |
| 4,894,991 | 1/1990 | Kawamura | 60/608 |
| 4,901,530 | 2/1990 | Kawamura | 60/608 |
| 4,918,923 | 4/1990 | Woollenweber et al. | 60/614 |
| 4,935,656 | 6/1990 | Kawamura | 310/156 |
| 4,955,199 | 9/1990 | Kawamura | 60/608 |
| 4,958,497 | 9/1990 | Kawamura | 60/608 |
| 4,958,708 | 9/1990 | Kawamura | 192/0.098 |
| 4,981,017 | 1/1991 | Hara et al. | 60/608 |
| 4,998,951 | 3/1991 | Kawamura | 60/608 |
| 5,025,629 | 6/1991 | Woollenweber | 60/600 |
| 5,038,566 | 8/1991 | Hara | 60/608 |
| 5,074,115 | 12/1991 | Kawamura | 60/608 |
| 5,088,286 | 2/1992 | Muraji | 60/608 |
| 5,094,587 | 3/1992 | Woollenweber | 417/107 |
| 5,121,605 | 6/1992 | Oda et al. | 60/608 |
| 5,176,509 | 1/1993 | Schmider et al. | 417/423.7 |
| 5,406,797 | 4/1995 | Kawamura | 60/608 |
| 5,406,979 | 4/1995 | Kawamura | 60/608 |
| 5,485,045 | 1/1996 | Canders et al. | 310/156 |
| 5,560,208 | 10/1996 | Halimi et al. | 60/608 |
| 5,605,045 | 2/1997 | Halimi et al. | 60/607 |
| 5,739,602 | 4/1998 | Suzuki et al. | 310/156 |

MAGNET ASSEMBLIES FOR MOTOR-ASSISTED TURBOCHARGERS

FIELD OF INVENTION

This invention relates generally to turbochargers used with internal combustion engines, and more particularly to turbochargers with integral assisting electric motors, and to structures for, and methods of combining, the components of the assisting electric motor and the turbocharger.

BACKGROUND OF THE INVENTION

Turbochargers are well known and widely used with internal combustion engines. Generally, turbochargers supply more charge air for the combustion process than can otherwise be induced through natural aspiration. This increased air supply allows more fuel to be burned, thereby increasing power and torque obtainable from an engine having a given displacement. Additional benefits include the possibility of using lower displacement, lighter engines with corresponding lower total vehicle weight to reduce fuel consumption, and use of available production engines to achieve improved performance characteristics. Some turbocharger applications include the incorporation of an intercooler for removing heat (both an ambient heat component and heat generated during charge air compression) from the charge air before it enters the engine, thereby providing an even more dense air charge to be delivered to the engine cylinders. Intercooled turbocharging applied to diesel engines has been known, in some applications, to double the power output of a given engine displacement, in comparison with naturally aspirated diesel engines of the same engine displacement.

Additional advantages of turbocharging include improvements in thernal efficiency through the use of some energy of the exhaust gas stream that would otherwise be lost to the environment, and the maintenance of sea level power ratings up to high altitudes.

At medium to high engine speeds, there is an abundance of energy in the engine exhaust gas stream and, over this operating speed range, the turbocharger is capable of supplying the engine cylinders with all the air needed for efficient combustion and maximum power and torque output for a given engine construction. In certain applications, however, an exhaust stream waste gate is needed to bleed off excess energy in the engine exhaust stream before it enters the turbocharger turbine to prevent the engine from being overcharged. Typically, the waste gate is set to open at a pressure, above which undesirable predetonation or an unacceptably high internal engine cylinder pressure may be generated.

At low engine speeds, such as idle speed, however, there is disproportionately less energy in the exhaust stream as may be found at higher engine speeds, and this energy deficiency prevents the turbocharger from providing a significant level of boost in the engine intake air system. As a result, when the throttle is opened for the purpose of accelerating the engine from low speeds, such as idle speed, there is a significant time lag, i.e., turbo lag, and corresponding performance delay, before the exhaust gas energy level rises sufficiently to accelerate the turbocharger rotor and provide the compression of intake air needed for improved engine performance. The performance effect of this turbo lag may be more pronounced in smaller output engines which have a relatively small amount of power and torque available before the turbocharger comes up to speed and provides the desired compression.

Various efforts have been made to address the problem of turbo lag, including a reduction in the inertia of the turbocharger rotor. In spite of evolutionary design changes for minimizing the inertia of the turbocharger rotor, however, the turbo lag period is still present to a significant degree, especially in turbochargers for use with highly rated engines intended for powering a variety of on-highway and off-highway equipment.

Furthermore, to reduce exhaust smoke and emissions during acceleration periods when an optimal fuel burn is more difficult to achieve and maintain as compared with steady-speed operation, commercial engines employ devices in the fuel system to limit the fuel delivered to the engine cylinders until a sufficiendy high boost level can be provided by the turbocharger. These devices reduce excessive smoking, but the limited fuel delivery rate causes a sluggishness in the response of the engine to speed and load changes.

The turbo lag period can be mitigated and, in many instances, virtually eliminated by using an external power source to assist the turbocharger in responding to engine speed and load increases. One such method is to use an external electric power supply, such as the electrical energy stored in batteries, to power an electric motor that has been integrated into the mechanical design of a turbocharger. By providing the motor components within the turbocharger housing, the turbocharger bearings can also serve as motor bearings.

Providing motor components within a turbocharger assembly presents, however, a number of problems. Such motor components include permanent magnets to provide an electric motor rotor and wire windings to provide an electric motor stator, and the permanent magnets and stator windings must be in sufficient proximity to permit a relatively efficient conversion of electric energy applied to the stator windings into rotational energy imparted to the turbocharger rotor by the permanent magnets. The attachment of permanent magnets to the shaft exposes the permanent magnets to heat which is conducted down the shaft from the exhaust gas turbine wheel, and the exposure of the permanent magnets to such heat and their resulting temperatures may deleteriously affect the permeability and magnet field strength of the rotor magnets and result in insufficient and ineffective operation of the electric motor. In addition, the permanent magnets are exposed, in their rotation, to significant centrifugal forces since the turbocharger shaft can rotate at speeds up to 100,000 rpm and higher. The addition of stator windings within a turbocharger assembly also presents problems because the high temperatures that are reached in the turbocharger assembly can adversely affect the electrical insulation of the stator windings leading to possible failure.

A turbocharger assembly, including an integral assisting motor is disclosed in our prior U.S. patent application Ser. No. 08/680,671, filed Jul. 16, 1996, and U.S. Ser. No. 08/731,142, filed Oct. 15, 1996, which have addressed these problems and others.

Other patents disclosing turbocharger-electrical machine combinations include U.S. Pat. Nos. 5,406,797; 5,038,566; 4,958,708, 4,958,497; 4,901,530; 4,894,991; 4,882,905; 4,878,317, and 4,850,193.

BRIEF STATEMENT OF THE INVENTION

The invention provides a new integral turbocharger-electric motor assembly in which the elements of an operating electric motor and turbocharger can be easily assembled into a relatively compact and reliable operating unit. Such a turbocharger-motor assembly includes a central portion between the turbocharger turbine and compressor including a housing carrying, in a cooled supporting portion, a stator winding for the electric motor and providing bearing support adjacent its ends for the turbocharger shaft. To act as the electric motor rotor, the turbocharger shaft carries a magnet assembly in its central portion between the shaft bearings, in such proximity to the stator windings to provide electromagnetic coupling for the effective conversion of electric energy applied to the stator winding into rotational force applied by the magnet assembly to the turbocharger shaft. In preferred such assemblies, the turbocharger housing includes a conduit for coolant for the stator windings.

In the invention, the magnet assembly includes a plurality of permanent magnets located around a central core and secured against centrifugal force by a non-magnetic outer sleeve. Preferably, such magnet assemblies are formed as a unit that can be assembled onto the turbocharger shaft by retaining an annular arrangement of motor magnets in an assembly between central and outer sleeves. In a preferred embodiment of the invention, the magnets can be secured around the central sleeve and within the retaining sleeve by a high-temperature structural adhesive, and the retaining sleeve can include inwardly projecting portions at its ends for an engagement with the ends of the magnets. Such a magnet assembly can be removably mounted on the turbocharger shaft between the turbocharger bearings and clamped in place by the axial force exerted on its ends by shaft sleeves when a rotor lock nut is tightened. The central core of the magnet assembly may be formed with a plurality of planar magnet-locating surfaces and ends, having a reduced surface area to reduce heat transfer to the magnets. In preferred magnet assemblies the inside surface of the central sleeve may be relieved in its central portion to reduce the area of contact with the turbocharger shaft, and reduce the heat flow from the shaft into the magnet assembly. In addition, in the turbocharger-electric motor assembly, or in the magnet assembly itself, insulating material may be placed between the central sleeve of the magnet assembly and the turbocharger shaft to limit heat transfer into the magnet assembly.

Further features and advantages of the invention will be apparent from the drawings and more detailed description that follows.

BRIEF DESCRIPTION OF THE DRAWINGS

FIG. 2, for example, is an end view of the magnet assembly, taken at a plane along line 2—2 of FIG. 1, showing a central sleeve surrounded by a plurality of magnets encompassed by an outer retaining sleeve;

FIG. 3 is a cross-sectional view of the magnet assembly of FIG. 2 taken at a plane through its central axis;

FIG. 4 is a cross-sectional view of another magnet assembly of the invention taken at a plane through its central axis, illustrating relief of the inner surface of the magnet assembly for reduced contact with the turbocharger shaft; and FIG. 5 is a cross-sectional view through a magnet assembly and a central portion of a turbocharger shaft taken at a plane through their central axes, illustrating a thermal insulative element between the turbocharger shaft and the magnet assembly;

DETAILED DESCRIPTION OF THE PREFERRED EMBODIMENTS

Figure 1:
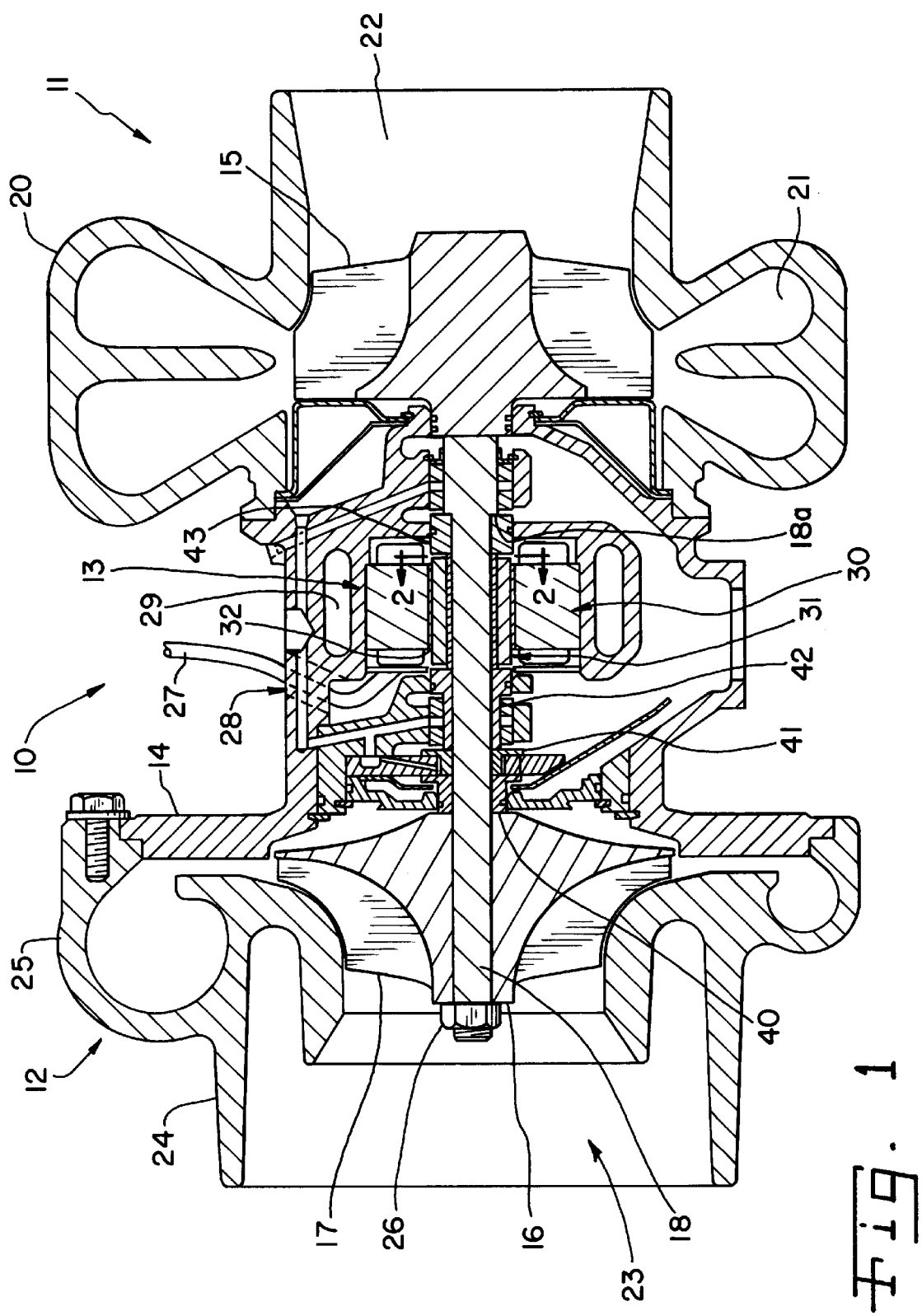
FIG. 1 is a cross-sectional view, taken at a vertical plane through its central axis, of one turbocharger-electric motor assembly of the invention, including a magnet assembly removably mounted between clamping sleeves on a turbocharger shaft, a plurality of motor stator windings positioned in the central housing, and a surrounding cooling conduit.

Referring now to the drawings, and particularly to FIG. 1, a turbocharger 10 combines the elements of an electric machine and a turbocharger in accordance with this invention. The turbocharger assembly 10 comprises an exhaust gas turbine 11 at one end, a charge air compressor 12 at the other end, and an assisting electric motor 13 in a central housing 14 of the turbocharger 10. The central housing 14 supports, through bearings at its turbine end and compressor end, a multi-vaned turbine wheel 15, a compressor wheel 16 having a plurality of vanes 17, and an interconnecting rotatable shaft 18. The turbine 11 includes a turbine housing 20 which forms an exhaust gas inlet scroll 21 that is connected to receive exhaust gas from an internal combustion engine (not shown). Internal combustion engines frequently have exhaust manifolds divided into two sections, each section receiving exhaust gas from a separate set of cylinders (not shown). The exhaust gas is directed from the inlet scroll 21 to drive the turbine wheel 15 and shaft 18 in rotation. After passing through the turbine wheel 15, the exhaust stream flows out of the turbocharger through an exhaust vent 22.

Rotation of the shaft 18 rotates the compressor wheel 16 at the opposite end of the interconnecting shaft 18, and air is drawn in through an air intake opening 23 formed in a compressor casing 24 after passing through an appropriate air filter (not shown) to remove contaminants. The compressor casing 24 includes a scroll 25 for directing the compressed combustion air to an engine air intake manifold (not shown).

In the invention, the elements of electric motor 13 are incorporated in the central portion of the turbocharger assembly 10. The elements of the assisting electric motor comprise a stator 30, including a plurality of pole-forming laminations of magnetic material and wire windings for the poles so formed, that is carried by housing 14, and a rotor including a plurality of magnets in a magnet assembly 32 that is carried by and attached to the rotatable shaft 18. In the assembly the rotor magnets of the magnet assembly 32 are carried in electromagnetic proximity to the poles formed by the lamination and windings of the stator 30 so that a rotating magnetic field formed by the application of electrical energy to the stator windings can effectively coupled with the magnetic field of the rotor magnets and drive the rotatable shaft 18 in rotation. In the preferred assembly of FIG. 1, the housing 14 provides cooled support for the stator windings. For example, as shown in FIG. 1, the housing 14 is formed with a coolant conduit 29 in such proximity to the housing surfaces in contact with the stator 30 that circulation of a coolant, such as engine coolant, can maintain the temperature of the stator windings below a temperature that may be damaging to their electrical insulation. The invention provides an easily assembled and reliably operable motor-assisted turbocharger. As set forth below, the rotor 31 of the electric motor can comprise a unitary magnet assembly 32 carrying the plurality of rotor magnets in a spaced arrangement about the rotatable shaft 18 of the turbocharger for effective interaction with the stator 30 when energized. The unitary magnet assembly 32 may be slipped onto the rotatable shaft 18 and fixed to the shaft to transfer rotational force from the magnet assembly 32 to the shaft 18 and assist in the rotation of compressor wheel 16 by the turbine wheel 15.

For example, the rotating elements of turbocharger assembly 10 can be attached together as a rotating unit by a lock nut 26 that compresses the rotating elements against a shoulder 18a formed on the rotating shaft 18. As illustrated by FIG. 1, mounted on the shaft 18 in succession are compressor wheel 17, sleeve 40, thrust collar 41, bearing sleeve 42, magnet assembly 32, seal sleeve 43, with sleeve seal 43 bearing against a shoulder 18a on shaft 18. The lock nut 26 exerts an axial force on all these members to maintain them as a rotating unitary assembly. The magnet assembly 32 is thus clamped tightly on shaft 18 between the bearing sleeve 42 and the seal sleeve 43 and can apply rotational forces to the shaft 18.

The stator windings 30 of the motor can be mounted in the turbocharger central housing 14 and secured by a set screw (not shown). Winding wires 27 can exit the housing 14 through passageway 28 for connection to an appropriate electronic control and power supply. As shown in FIG. 1, the coolant conduit 29 surrounds stator windings 30 and is separated from the stator 30 by a relatively thin housing wall, which can transfer heat from the stator windings 30 to a coolant in conduit 25. Cooling conduit 29 has inlet and outlet connections (not shown) to receive a cooling fluid from the internal combustion engine cooling system.

Thus, when the stator 30 is energized, rotational forces are applied to the shaft 18 on which the compressor wheel 17 is mounted and augment the torque being applied to the shaft 18 by the exhaust gas turbine 11, thereby causing the assembly to rotate faster than if it were not equipped with the assisting motor 13. The faster rotation of the shaft 18 when the assisting motor 13 is energized drives the compressor wheel 17 to supply the engine with a greater flow of charge air at higher pressure, thereby improving engine performance while reducing the amount of smoke and pollutants emitted during acceleration of the engine.

The components of the turbocharger not discussed in detail are well known in the art, such as shaft bearings and oil seal elements necessary for reliably supporting the rotating assembly and for containment of the lubricating oil that is conventionally supplied from the engine's pressurized oil system to lubricate and cool the bearings.

Figure 2:
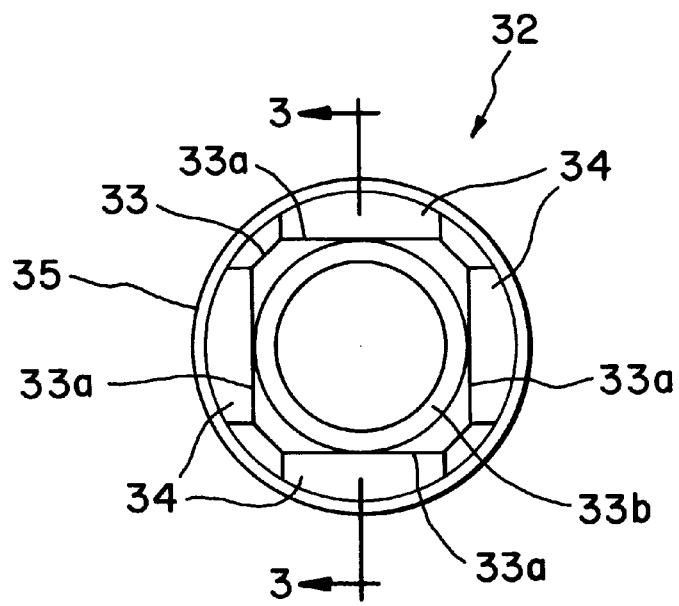
FIGS. 2–5 illustrate magnetic assemblies of the invention.
Figure 3:
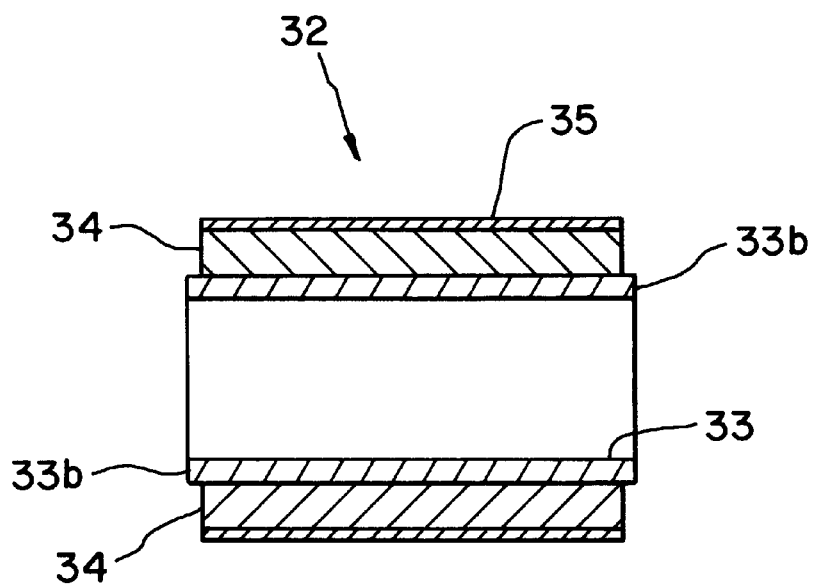

FIG. 2 is a cross-sectional view of the magnet assembly 32 of FIG. 1, taken at a plane corresponding to line 2—2 of FIG. 1, and FIG. 3 is a cross-sectional view of the magnet assembly 32 taken at a plane corresponding to line 3—3 of FIG. 2. As shown in FIGS. 2 and 3, magnet assembly 32 includes a sleeve-like inner core 33 of a magnetic material, such as carbon steel, on which a plurality of permanent motor magnets 34 are placed. As shown by FIG. 2, the inner core 33 is formed with a plurality of planar magnet-locating surfaces 33a for spacing the magnets 34 about the turbocharger shaft for interaction with the poles formed by the stator 30. As also shown in FIGS. 2 and 3, the inner core 33 has ends 33b with reduced surface areas (e.g., minimal thicknesses) to reduce the heat transfer to the magnets 34 from the adjacent turbocharger parts. The magnets 34 are encompassed and retained by an outer, non-magnetic sleeve 35 designed with sufficient strength to hold the magnets 34 in place at the maximum rotational speed of the turbocharger. The inner core 33, magnets 34 and outer sleeve 35 comprise a unitary magnetic assembly 32 which serves as the electric motor rotor in the turbocharger assembly 10. In preferred embodiments, the components of the magnet assembly can also be secured together as a unit by an appropriate high temperature structural adhesive.

Figure 4:
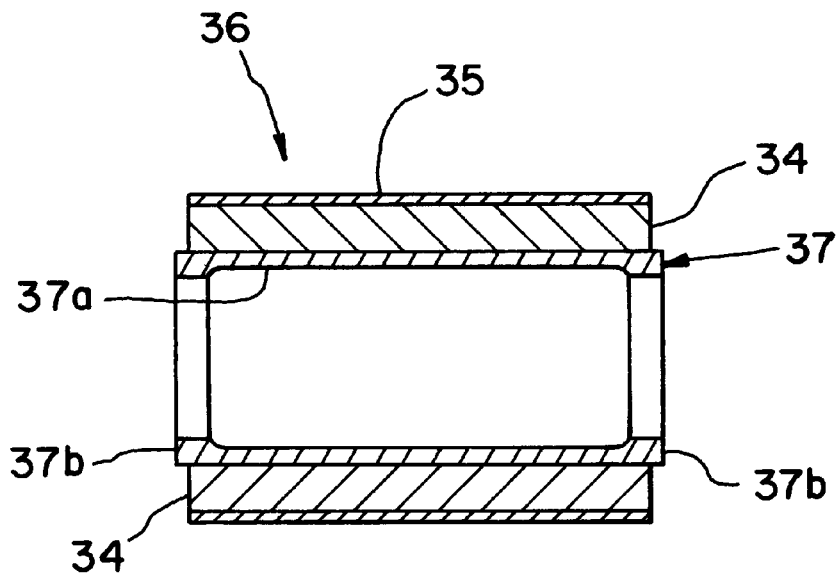

FIG. 4 is a cross section of another magnet assembly 36, in which the inner core 37 has been formed with a inner surface portion 37a having an increased diameter so that it is removed from contact with the shaft 18, and radialy-inwardly extending portions 37b bracketing the inner surface portion 37a for supporting the core 37 on the shaft 18. The resulting reduced contact area between the inner core 37 and shaft 18 reduces the heat transfer from the turbocharger shaft 18 to the permanent magnets 34.

Figure 5:
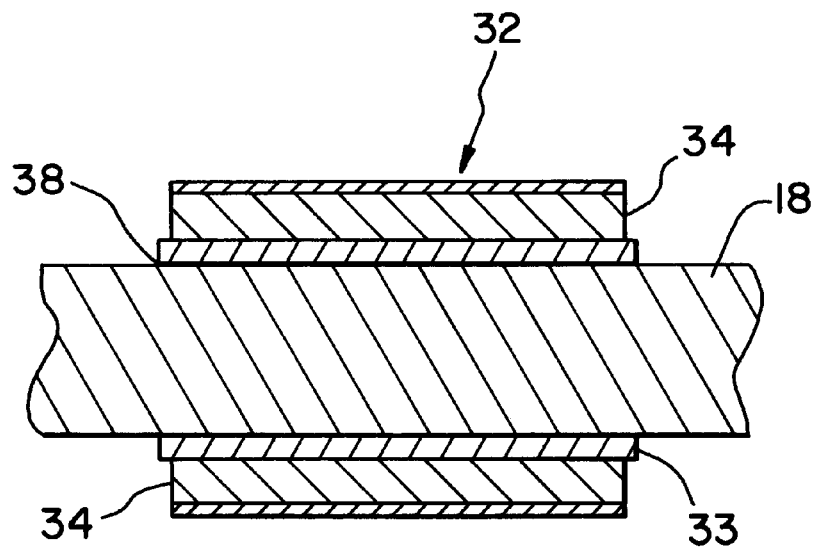

FIG. 5 is a cross-sectional view of the magnet assembly 32 of FIGS. 2 and 3 assembled onto the shaft 18 with thermal insulating numeral between the inner core 33 and the turbocharger shaft 18 to reduce heat transfer from the turbocharger shaft 18 to the permanent magnets 34. As shown in FIG. 5 the thermal insulating material may be conveniently in the form of a thermally insulative sleeve 38 between the inner core 33 and shaft 18.

Figure 6:
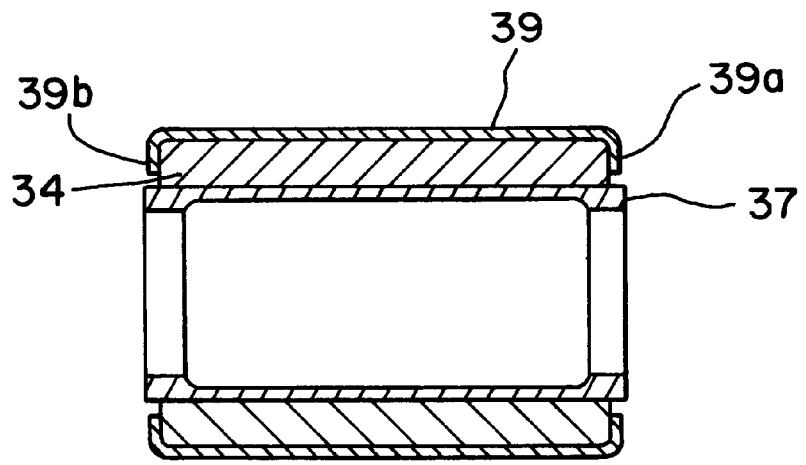
FIG. 6 is a cross-sectional view of another embodiment of a magnet assembly of the invention taken at a plane through its central axis.
Figure 7:
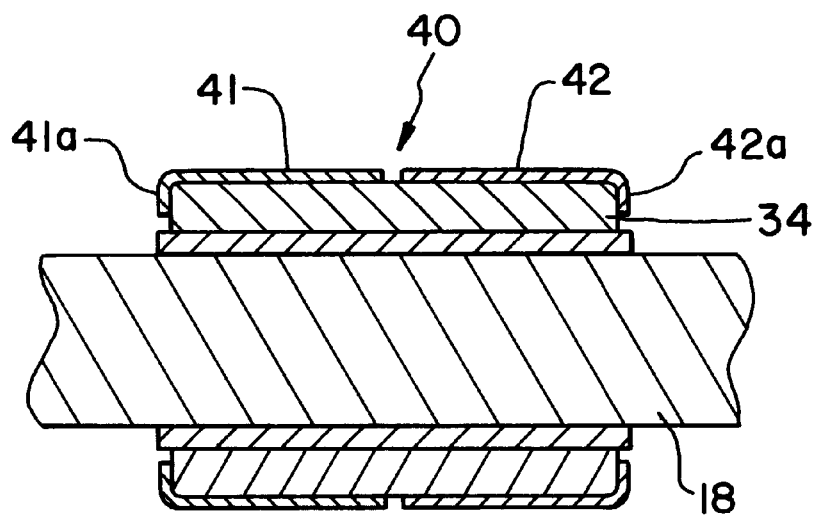
FIG. 7 is a cross-sectional view of still another embodiment of a magnet assembly of the invention in place on a turbocharger shaft, taken at a plane through their central axes.

FIGS. 6 and 7 illustrate further embodiments of a magnet assembly of the invention. In the embodiments of FIGS. 6 and 7, the sleeve-like inner core can be in all respects identical to the sleeve-like inner core shown in FIGS. 2–4, forming a plurality of planar magnet locating surfaces 33a for spacing magnets 34 about the turbocharger shaft. In the magnet assembly of FIG. 6 the outer non-magnetic metallic sleeve 39 has its ends 39a and 39b rolled inwardly over the ends of the permanent magnets 34 as shown in the FIG. 6 cross-section. In the embodiment of FIG. 7, the outer non-magnetic metallic sleeve 40 comprises two sections 41 and 42 which are preferably identical. Each of the sections 41 and 42 is formed with an inwardly extending annular flange 41a, 42a, providing a cup-like form. In the embodiment of FIG. 7 each of the sections 41 and 42 may be slid over the magnets 34 until their inwardly extending annular flanges 41a and 42a engage the ends of the magnets 34. In the embodiment of FIG. 7 the two cup-like sleeve sections 41 and 42 may be secured in place by suitable adhesive or by shrink fit onto the magnets 34. In the embodiments of FIGS. 6 and 7, the outer sleeves 39 and 40 help prevent axially displacements of the magnets 34 of the magnet assembly.

While preferred embodiments of the invention have been illustrated and described, the invention can be incorporated in other embodiments and should be limited only by the scope of the following claims and the prior art.

We claim:

1. A turbocharger assembly including an integral assisting electric motor, comprising:

a rotatable shaft assembly having an exhaust gas turbine wheel on one end and a compressor wheel on the other end and having a central length extending between shaft bearings at its turbine end and its compressor end;

a housing encompassing the central length of said rotatably shaft and carrying said shaft bearings at its turbine end and at its compressor end and providing therebetween a support for stator windings for said integral assisting electric motor;

a unitary magnet assembly of said integral assisting electric motor comprising a plurality of magnets carried between an inner core and an outer sleeve, said inner core providing magnet-locating surfaces for the plurality of magnets and having a reduced-thickness relieved portion under the magnet-locating surfaces, said inner core being carried by its ends outside of its reduced-thickness relieved portion on the central length of the rotatable shaft with the plurality of magnets in electromagnetic proximity to said stator windings;

a turbine housing for directing exhaust gas into said exhaust gas turbine wheel for rotation of said rotatable shaft and said compressor wheel; and a compressor casing cooperating with said compressor wheel for compressing and directing compressed air from said turbocharger assembly.

2. The turbocharger assembly of claim 1 wherein said housing provides cooled support for said stator windings comprising a coolant conduit formed in the housing adjacent the stator windings.

3. The turbocharger assembly of claim 2 wherein said coolant conduit surrounds the stator windings.

4. The turbocharger assembly of claim 1 wherein the inner core of said magnet assembly is formed for minimal contact with the central length of the rotatable shaft.

5. The turbocharger assembly of claim 1 wherein the inner core, outer sleeve and plurality of magnets are fastened into a unitary magnet assembly by a temperature-resistant structural adhesive.

6. The turbocharger assembly of claim 1 wherein the inner core of said magnet assembly is slidable over the central length of the rotatable shaft, and is held for rotation as an integral part of the rotatable shaft by clamping its ends.

7. The turbocharger assembly of claim 1, wherein the ends of the inner core have reduced surface areas to reduce heat transfer to the plurality of magnets.

8. The turbocharger of claim 1 wherein the outer sleeve is bent down over the ends of the magnets to constrain them from axial movement.

9. The turbocharger of claim 1 wherein the outer sleeve is formed by two cup-like sections, each including an inwardly projecting annular flange for engagement with the ends of the magnets.

10. In a turbocharger assembly with an integral electric motor, the improvement comprising a unitary magnet assembly on the turbochargers shaft, including a plurality of magnets, an inner core for locating and carrying said plurality of magnets, and an outer sleeve for retaining the plurality of magnets in the unitary magnet assembly, said inner core having ends in contact with the turbocharger shaft and an inside surface that is relieved in its central portion for reduced contact with the turbocharger shaft.

11. The improvement of claim 10 wherein said plurality of magnets, inner core and outer sleeve are held together as a unit by a temperature-resistant structural adhesive.

12. The improvement of claim 10 wherein the outer sleeve is bent inwardly at its ends over the magnets.

13. The improvement of claim 10 wherein the outer sleeve comprises a pair of cup-like sleeves with inwardly projecting annular flanges for engagement with the plurality of magnets, said cup-like sleeves being assembled over the ends of the magnet assembly.

14. A magnet assembly for a brushless electric motor located within a turbocharger, comprising an inner core around which a plurality of magnets is arranged, and an outer sleeve encompassing the plurality of magnets to retain them in place when the turbocharger is rotated at high speed, wherein the inside diameter of the inner core is relieved along a large portion of its central length so as to present minimal contact with the shaft and reduce heat transfer into the magnet assembly.

15. The magnet assembly of claim 14 wherein the surface area of each end of the inner core is reduced to reduce the contact area with adjacent clamps.

16. The magnet assembly of claim 14 wherein said plurality of magnets, inner core, and outer retaining sleeve are cemented together with a temperature-resistant structural adhesive.

17. The magnet assembly of claim 14 wherein the inner core forms a plurality of planar magnet-locating surfaces in its central portion and has annular ends with minimal surface areas for reduced contact with adjacent parts.

18. The magnet assembly of claim 14 wherein the outer sleeve is formed to provide inwardly projecting annular portions over the ends of the plurality of magnets.

19. A magnet assembly for a brushless electric motor located within a turbocharger, comprising an inner core around which a plurality of magnets is arranged, and an outer sleeve formed by two cup-like sections, each cup-like section forming an inwardly projecting annular flange and being insertable over the ends of the plurality of magnets in the magnet assembly and encompassing the magnets to retain them in place when the turbocharger is rotated at high speed.

20. The magnet assembly of claim 19 wherein the cup-like sections are substantially identical.

21. The magnet assembly of claim 19 wherein the cup-like sections have an interference fit on the magnet assembly.

22. The magnet assembly of claim 19 wherein the cup-like sections are secured to the magnet assembly with an adhesive.

* * * * *

UNITED STATES PATENT AND TRADEMARK OFFICE
CERTIFICATE OF CORRECTION

PATENT NO. : 6,085,527  
DATED : July 11, 2000  
INVENTOR(S) : William E. Woollenweber and Edward M. Halimi Page 1 of 1

It is certified that error appears in the above-identified patent and that said Letters Patent is hereby corrected as shown below:

Column 1,  
Line 35, please delete "thernal" and insert --thermal--.

Column 4,  
Line 53, between the words "can" and "effectively" please insert --be--.

Column 6,  
Line 8, please delete "radialy" and insert --radially--.

Column 6,  
Line 16, please delete "numeral" and insert --material--.

Column 6,  
Lines 57-58, please delete "rotatably" and insert --rotatable--.

Signed and Sealed this

Twelfth Day of June, 2001

*Nicholas P. Godici*

*Attest:*

NICHOLAS P. GODICI  
*Attesting Officer*  *Acting Director of the United States Patent and Trademark Office*